United States Patent Office 2,967,662
Patented Jan. 10, 1961

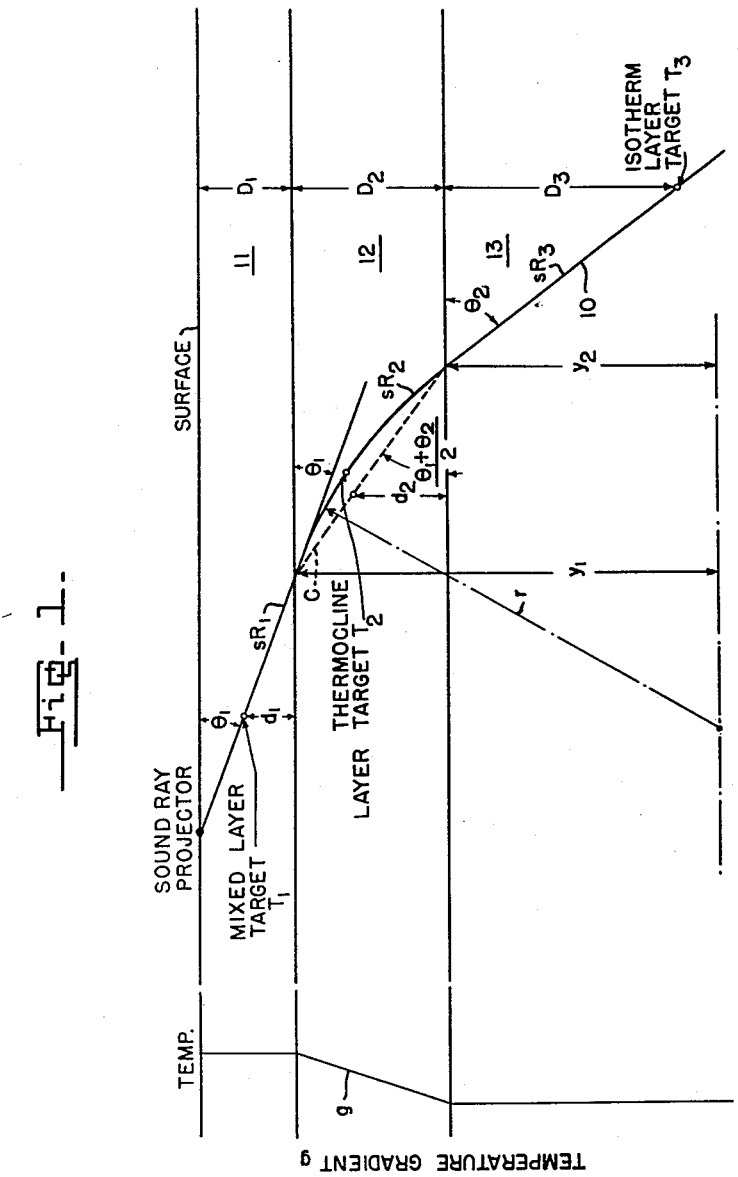

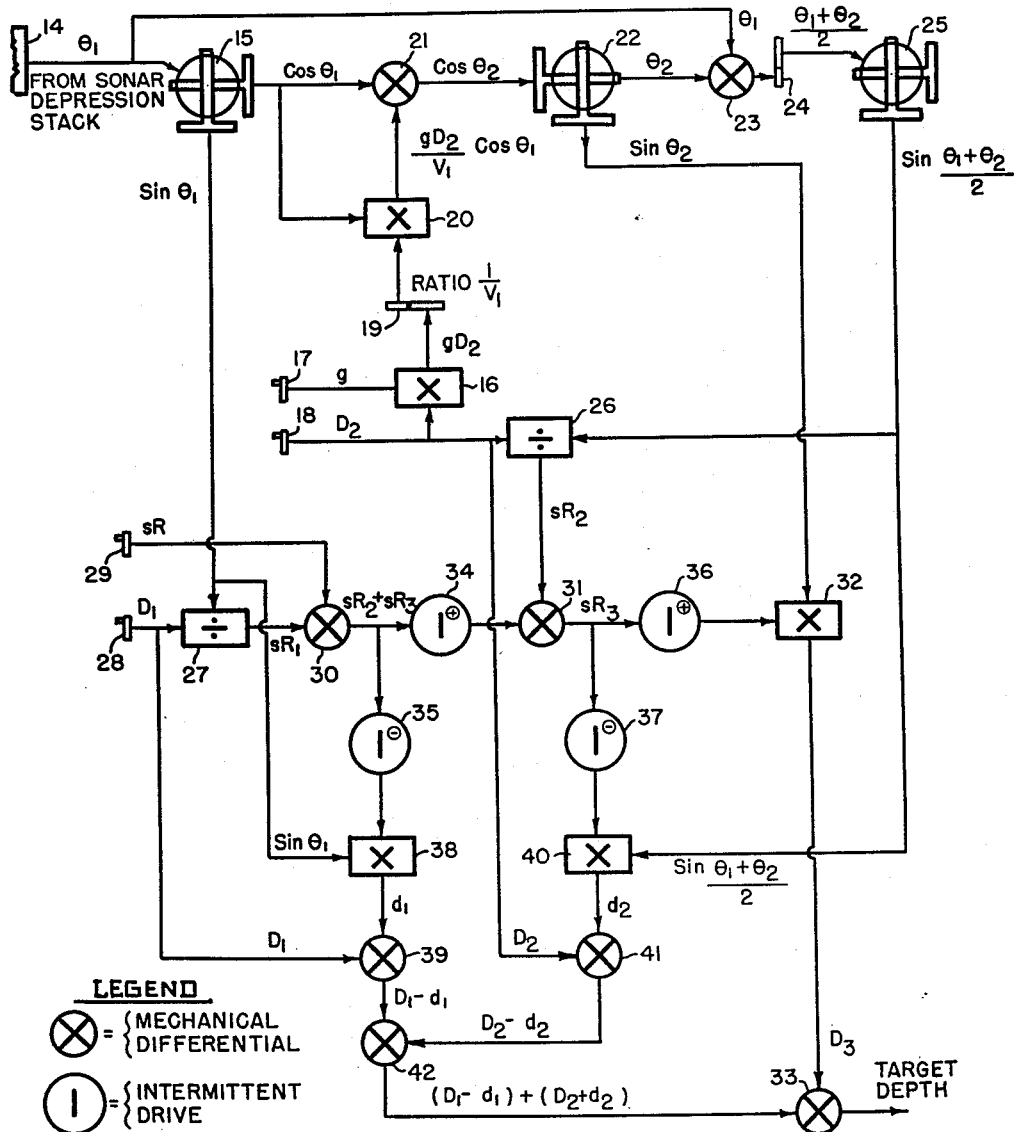

2,967,662

SUBMARINE DEPTH COMPUTER

Charles H. Bauer, Los Angeles, Calif., assignor to the United States of America as represented by the Secretary of the Navy Filed Oct. 19, 1950, Ser. No. 190,946

5 Claims. (Cl. 235—61.5)

The invention relates to improvements in trigonometric calculators and more specifically to a calculator associated with underwater echo-distance slant range measuring equipment for computing a component of the target slant range, such as target depth.

The velocity gradient of a sound ray in water is a function of the sum of the temperature, pressure and salinity gradients. Because of the variation in density of sea water as a result of non-uniform temperature and salinity, and the compressibility effect as a function of depth, an underwater sound ray is refracted and may be bent up or down as it passes through the medium. It has been established by others, using Snell's law, that the sound ray path is a straight line when the velocity gradient is zero, and is an arc of a circle when the velocity gradient is other than zero but linear. Because of the small effect of the pressure gradient, and usually the small effect of the salinity gradient, these two may for practical purposes be neglected in the computation of underwater target slant range components. As for the temperature gradient, approximately 98% of observed bathythermograph curves are of the type which are isothermal or negative gradients or combinations thereof.

The primary object of the present invention is to provide a device which will continuously compute a slant range component, such as depth, using information from sonar detection equipment and making the necessary refraction correction according to information obtained from a bathythermograph.

A further object is the provision of a device which will continuously compute a slant range component, such as depth of an underwater target in a body of water comprising layers of different velocity gradients, using information from sonar detection equipment and from a bathythermograph, and correcting for any refraction of the sound ray regardless of the layer in which the target is located.

Other objects and advantages of the invention will be apparent during the course of the following detailed description, taken in connection with the accompanying drawings, forming a part of this specification, and in which drawings:

Fig. 1 is a diagrammatic view illustrating the general solution of the problem; and Fig. 2 is a diagrammatic view illustrating a mechanical system for solution of the problem using standard fire control component parts.

The drawings for the purpose of illustration show only a preferred embodiment of the invention. In Fig. 1, the curve 10 indicates the path of the sound ray through layers 11, 12, 13 of water whose temperature gradient is indicated by the curve $g$. In this case the path of the sound ray to the isotherm layer target $T_3$ is a straight line $sR_1$ in the mixed layer 11, an arc $sR_2$ of a circle in the thermocline layer 12 and a straight line $sR_3$ in the isotherm layer 13. This is a general case for the combination of isothermal and negative gradients and by varying the depths of the mixed layer 11 and the thermocline 12, any combination can be obtained.

Still referring to Fig. 1, the solution of the above-stated general case consists of computing the angle $\theta_2$ at which the sound ray enters the lower isothermal layer 13, and measuring down the determined path the amount of the slant range $sR_3$ to locate the isotherm layer target. The depth $D_1$ of the mixed layer 11, the depth $D_2$ of the thermocline 12, and the temperature gradient $g$ are given by the bathythermograph curve. The depression angle $\theta_1$ of the sound projector and the total slant range are given by the sonar equipment. Therefore a continuous solution for the target depth $D_3$ in the isotherm layer 13 can be determined, and hence the total target depth.

The simplified apparatus shown in Fig. 2 provides for the solution of only one negative gradient. This is by far the most frequently occurring case but the apparatus may if desired include equipment providing solutions for several negative gradients. Provision is made in the device for locating targets $T_1$, $T_2$ in either the mixed or thermocline layers 11, 12 if such is the actual position of the target.

By neglecting the effects of the pressure and salinity gradients of sea water, the velocity gradient when linear becomes the same as the temperature gradient $g$ and is defined:

$$V_2 = V_1 + gD \tag{1}$$

where:
$V_1$=velocity of sound at first point
$V_2$=velocity of sound at second point
$g$=temperature gradient
$D$=difference in depth between first and second points Snell's law states:

$$\frac{V_1}{\cos \theta_1} = \frac{V_2}{\cos \theta_2} \tag{2}$$

hence the expression:

$$\cos \theta_2 = \cos \theta_1 \left(1 + \frac{gD}{V_1}\right) \tag{3}$$

is obtained in which $V_1$ is the velocity of sound in the medium at the initial point. This Equation 3 must be calculated in the computer.

Figure 2 illustrates a mechanical system for solution of the problem. From the stabilized sound stack of the sonar equipment 14 the projector depression angle $\theta_1$ is received as a synchro signal and its cosine obtained by a conventional component solver 15.

The temperature gradient $g$ and the thermocline depth $D_2$ given by the bathythermograph curve are transferred to a multiplier 16 by setting the handwheels 17, 18. The gradient $g$ is determined from temperature and depths taken from the bathythermograph record and a factor K. A short calculation is made by hand and the gradient $g$ is cranked in by adjustment of the handwheel 17. A more automatic introduction of the gradient $g$ could be made by cranking into a differential or subtracting device the temperatures at the top and bottom of the thermocline layer, and dividing the differential output by the thermocline depth $D_2$ to obtain the gradient $g$. Since the factor K is essentially a linear function of the temperature, it is determined by multiplying the mean thermocline temperature by the slope of the K-temperature curve through a fixed gear ratio or lever ratio and adding a constant. The product of K and the temperature gradient obtained from a multiplier yields the temperature gradient $g$, that is, the velocity gradient neglecting the effects of salinity and pressure. The calculation of velocity gradient including pressure and salinity gradients can be accomplished mechanically if desired. The product $gD_2$ given by the multiplier 16 is divided by the sound velocity $V_1$, taken to be constant, through the operation of gearing 19 having a ratio $1/V_1$. The quotient $gD_2/V_1$ and $\cos \theta_1$ are then multiplied in a multiplier 20. The product of this multiplication is added to $\cos \theta_1$ by a mechanical differential 21, thus solving Equation 3 and obtaining $\cos \theta_2$. The angle $\theta_2$ is then obtained in a component solver 22, added to angle $\theta_1$ by a mechanical differential 23 and the sine of one-half this sum obtained by successive operation of gearing 24 having a ratio 1/2 and a component solver 25. This sine value is divided by the thermocline depth $D_2$ in a diveder 26 to obtain the slant range $sR_2$ in the thermocline layer. As shown in Fig. 1, this computation of the slant range $sR_2$ is along the chord C of the arc $sR_2$ rather than actually along the arc. An exact solution can be made but this approximation introduces only small errors and is easily computed.

The mixed layer depth $D_1$, given by the bathythermograph curve is communicated to a divider 27 by setting a handwheel 28. The mixed layer depth $D_1$ is divided by $\sin \theta_1$ derived by the component solver 15 to obtain the slant range $sR_1$ in the mixed layer. The total slant range $sR$ given by the sonar equipment 14 is transmitted, as by setting handwheel 29, to a mechanical differential 30 which subtracts the mixed layer slant range $sR_1$ therefrom and thus obtains the sum of the slant range $sR_2$ and $sR_3$ of the thermocline and isotherm layers, respectively. From this sum the slant range $sR_2$ in the thermocline layer is subtracted by a mechanical differential 31 obtaining the isotherm layer slant range $sR_3$. This slant range $sR_3$ is multiplied by $\sin \theta_2$ in a multiplier 32 to obtain the target depth $D_3$ in the bottom layer 13. This is added by a mechanical differential 33 to the upper and intermediate layer depths $D_1$ and $D_2$ to obtain the total target depth.

Provision is made through the use of unidirectional or intermittent drives 34—37 to compute the target location in the mixed or thermocline layer if such is the case. In case of a target $T_1$ lying in the mixed layer 11, then the slant range $sR_1$ in the mixed layer is greater than the target slant range $sR$ so that a negative value is obtained by the calculator for slant ranges $sR_2+sR_3$. Two of the intermittent drives 34, 36 transmit only positive values, the other two drives 35, 37 transmit only negative values. In this case the intermittent drive 34 stops information going to the mechanical differential 31 and drive 35 transmits it to the multiplier 38 which multiplies it by $\sin \theta_1$ to obtain the elevation $d_1$ of the target in the mixed layer 11. This is then subtracted from the mixed depth $D_1$ by a mechanical differential 39. Since the sum of the ranges $sR_2$ and $sR_3$ going to the differential 31 is then zero because of the blocking action of drive 34, the differential 31 in subtracting $sR_2$ makes the slant range $sR_3$ equal the negative value of the slant range $sR_2$. Hence the second multiplier 40, operating through the differential drive 37, computes the thermocline target elevation $d_2$ equal to the thermocline depth $D_2$. Under these circumstances, the output of the differential 41 is zero and nothing is added by the differential 42 to the output $D_1-d_1$ of the differential 39. Also the depth $D_3$ is computed as zero inasmuch as nothing representing the value of $sR_3$ is transmitted to multiplier 32 because of the blocking action of drive 36. It should be understood that as used herein the mixed layer is considered the upper layer, the thermocline layer is considered the middle layer and the isotherm layer is considered the lower layer. The mixed or upper layer target elevation is considered the distance above the lowermost boundary surface of the mixed layer and the thermocline or middle layer target elevation is considered the distance above lowermost boundary surface of the thermocline layer.

In case of a target $T_2$ lying in the thermocline layer, the total slant range $sR$ is greater than the slant range $sR_1$ in the mixed layer so that the output of the mechanical differential 30 will be a positive value. Therefore the intermittent drive 35 passes no information to the $d_1$ multiplier 38 so that its output $d_1$ is zero and the output $D_1-d_1$ of the differential 39 equals $D_1$ itself. The depth in the thermocline layer 12 is determined by the difference in depths $D_2-d_2$ in a manner similar to that previously described in dealing with a target in the mixed layer. The thermocline target depth is computed as depth $D_1+D_2-d_2$, depth $D_3$ still remaining zero.

From the foregoing description it is clear that elements 14, 15, 27, 28, 29, 30, 38 and 39, constitute a first calculator assembly capable of independently computing the depth components $D_1-d_1$ of the target slant range in the case of a target $T_1$ in the upper layer 11.

It is also clear from the foregoing description that elements 14—26, 31, 40, 41 and 42 constitute a second calculator assembly capable of computing the intermediate layer slant range $sR^2$ and jointly cooperable with the just mentioned first calculator assembly at element 42 to compute the depth component $D_1+D_2-d_2$ of the target slant range in the case of a target $T_2$ in the intermediate or thermocline layer 12.

Additionally it will be observed that elements 32, 33 constitute a third calculator assembly cooperable at 32 and 42 with the previously described first and second calculator assemblies to jointly compute the slant range component $D_1+D_2+D_3$ in the case of a target $T_3$ in the lower or isotherm layer 13, the cooperation of the three calculator assemblies being under the control of intermittent drives 34—37 constituting discriminator means capable of distinguishing between relative values of the various slant ranges in the several water layers and the total target slant range.

Instead of intermittent drives, servo follow-up systems can be used, their operation depending upon the algebraic signs of the slant range remainders to accomplish the same as the intermittent drives.

This type of solution for target depth also provides all information necessary for the computation of the true horizontal range of the target. In general, where a function of an angle is used for depth calculation, its cofunction would be used for horizontal range calculation. The values of the co-functions are given by the component solvers used. Horizontal range is basically determined by calculating the horizontal ranges in the top isothermal layer, in the thermocline layer and in the lower isothermal layer and taking their sum. The top layer horizontal range is merely the product of the cosine of the angle $\theta_1$ and the slant range in the layer and similarly the lower isothermal layer horizontal range is the product of the cosine of the angle $\theta_2$ and the slant range in that layer. In the thermocline layer the horizontal range is given by the expression:

$$hR_2 = r(\sin \theta_2 - \sin \theta_1)$$

where $r$ is the radius of the sound ray arc. Since both $\theta_1$ and $\theta_2$ are known their sines have either already been determined in the depth computation or can easily be taken from component solvers. The product of their difference and radius $r$ which has been determined in the depth solution yields the horizontal range $hR_2$. This solution makes no correction in slant range for change in absolute magnitude of the sound velocity but a refinement can do this mechanically.

An alternative solution of the problem can be obtained by using a component solver and a vector solver, standard units of fire control equipment, to determine the angle of the sound ray emerging from the thermocline layer. The radius $r$ of the sound ray arc $$\frac{V_1}{g \cos \theta_1}$$

is computed and used to position the speed pin representing the magnitude of the vector, and the angle $\theta_1$ positions its direction. This gives an output of the vertical component $y_1$ of the radius of the sound ray arc at the top of the thermocline layer.

Subtracted from the vertical component $y_1$ is the depth $D_2$ of the thermocline. This leaves the vertical component $y_2$ of the radius of the sound ray arc at the bottom of the thermocline which drives a slide of a vector solver whose speed pin is positioned in accordance with the calculated value of radius. The output then is commensurate with the magnitude of the angle $\theta_2$ made by the ray relative to the horizontal in emerging from the thermocline layer. The difference between angles $\theta_1$ and $\theta_2$ multiplied by the radius of the arc yields the slant range in the thermocline. This slant range together with the calculated slant range in the top isothermal layer calculated as indicated above are subtracted from the total slant range to give the slant range in the lower isothermal layer. This slant range multiplied by the sine of angle $\theta_2$ gives the depth of the target in the lower isothermal layer, hence the total depth when added to the depths $D_1$ and $D_2$. The use of intermittent drives or a similar system to permit computation of target depth in either of the two top layers as described above must be included in this system.

A second alternative solution by a method which may be termed regenerative, is based upon the initial assumption of a certain value which in general will be quite different from the accurate value later calculated. This assumption of a value starts the computing system which computes a corrective value to be added to the original assumed value until the sum of the corrective values and the original value satisfies the conditions as sent into the computer. In this particular problem the regenerative system is basically concerned with the generation of correct values of sound ray angles and slant range in the various layers. Computation of the angle $\theta_2$ is accomplished by generating an angle $\Delta\theta$ which is added to angle $\theta_1$. The change in angle $\Delta\theta$ is properly the quotient of the radius of the arc the sound travels and slant range in the thermocline layer. The initial calculation of $\Delta\theta$ is based on the sum of the slant range in the bottom two layers, the upper isothermal slant range having been subtracted from the total slant range. This computed value can be used in calculating the slant range in the thermocline along the chord of the arc with the known depth $D_2$ of the layer. The resulting slant range is fed back into the solution for $\Delta\theta$ and since it is different from the value initially used a corrected value of $\Delta\theta$ is obtained. The process continues until the computed $\Delta\theta$ no longer causes a correction for the input thermocline slant range. From this point the depth of the target in the lower isothermal layer is determined from the angle $\theta_2$ and the slant range in the layer as indicated above. This system also requires the intermittent drive or a similar system for computation of the target depth in either of the two layers.

Various changes may be made in the form of invention herein shown and described without departing from the spirit of the invention or the scope of the following claims.

What is claimed is:

1. In a combination of underwater sound echo-distance slant range measuring equipment of the type wherein an angularly movable sound ray projector is adapted to direct a sound ray toward an underwater target, the water between the target and the surface selectivity comprising a mixed upper layer, a mixed upper layer and a thermocline middle layer or a mixed upper layer, a thermocline middle layer and an isotherm lower layer, the underwater equipment including means to provide indication of the slant range in the water layers, bathythermograph means to provide indications of temperature gradients and of a component of the mixed and of the thermocline layers and a calculator for computing the component of said slant range; said calculator comprising means for computing said component of said slant range in the mixed layer, means for computing said component of said slant range in the thermocline layer, means for computing said component of said slant range in the isotherm layer and means for computing the total component of the slant range in all layers present between the target and the water surface; said means comprising first means settable in accordance with the bathythermograph indication of thermocline layer depth, second means settable in accordance with the bathythermograph indication of temperature gradient, means responsive to said first and second settable means for computing the quotient of their product divided by a constant factor representing the velocity in the medium at the initial point of entry into the water layers, means responsive to the output of said means for computing and to the sound ray projector angle to compute an output corresponding to the angle at which the sound ray enters the lower isothermal layer, means averaging said projector angle and said isotherm layer angle output to determine an output corresponding to the average path angle in the middle thermocline layer, means responsive to said first settable means and the average path angle output to compute an output corresponding to the approximate slant range in the middle layer, third means settable in accordance with the mixed layer depth, means responsive to the projector angle and to the third settable means to compute an output corresponding to the slant range in the upper mixed layer, fourth means settable in accordance with the total slant range, first subtracting means to compute the difference between the upper mixed layer slant range output and the setting of said fourth settable means, a positive output from and negative output from said first means to subtract respectively indicating target position beneath and above the mixed layer, second subtracting means responsive to a positive output and unresponsive to a negative output of said first means to subtract and to the approximate slant range in the middle layer to compute the difference therebetween which when positive represents the excess of the total slant range over the slant range of the upper layer and the approximate slant range of the middle layer and thus the slant range of the lower layer and when negative a target position above the lower layer, means responsive to a positive output and irresponsive to a negative output of said second subtracting means, and responsive to the isotherm layer angle output to compute the target depth in the lower layer and adding means responsive to the outputs of the first and third settable means and the output of said last-recited means for adding depths of the upper mixed layer, the middle thermocline layer and the lower isotherm layer to compute total target depth where the target is disposed in the isotherm layer such that the total slant range exceeds the slant ranges of the mixed layer plus the thermocline layer.

2. The apparatus of claim 1 including means responsive to a negative and unresponsive to a positive output of said first means to subtract, and to the sound ray projector angle to compute elevation of the target above the bottom of the mixed layer and third means to subtract the target elevation in the mixed layer from the total mixed layer depth to determine depth of a target disposed in the mixed layer.

3. The apparatus of claim 2 including means responsive to a negative output and unresponsive to a positive output from said second subtracting means, and to the average angle to compute elevation of a target above the bottom of the middle layer, fourth means to subtract the middle layer target elevation from the total middle layer depth to thereby compute target depth in the middle layer and means to add the mixed layer depth to the target depth of the target in the middle layer to thereby compute total target depth of a target in the middle layer.

4. In a combination of underwater sound echo-distance slant range measuring equipment of the type wherein an angularly movable sound ray projector is adapted to direct a sound ray toward an underwater target, the water between the target and the surface selectively comprising a mixed upper layer, a mixed upper layer and a thermocline middle layer and a mixed upper layer, a thermocline middle layer and an isotherm lower layer, the underwater equipment including means to provide indication of the slant range in the water layers, bathythermograph means to provide indications of temperature gradients and of a component of the mixed end of the thermocline layers and a calculator for computing the component of said slant range; said calculator comprising means for computing said component of said slant range in the mixed layer, means for computing said component of said slant range in the thermocline layer, means for computing said component of said slant range in the isotherm layer and means for computing the total component of the slant range in all layers present between the target and the water surface and wherein $D_1$=mixed layer depth
$D_2$=thermocline layer depth
$D_3$=depth of an isotherm layer target below the upper surface of the isotherm layer
$g$=temperature gradient
$V_1$=velocity of sound on entering the mixed layer
$\theta_1$=projector angle of depression
$\theta_2$=angle at which the sound ray enters the isotherm layer
$sR$=total slant range
$sR_1$=mixed layer portion slant range
$sR_2$=approximate thermocline layer portion slant range
$sR_3$=isotherm layer slant range
$d_1$=target elevation in the mixed layer when the target is disposed in the mixed layer
$d_2$=target elevation in the thermocline layer when the target is disposed in the thermocline layer adjustable means adapted to be set in accordance with $D_2$, adjustable means adapted to be set in accordance with $g$, a first multiplier having inputs coupled to said $D_2$ and said $g$ adjustable means to compute $gD_2$, ratio means coupled to said first multiplier output to divide $gD_2$ by $$\frac{1}{V_1}$$

a solver to resolve $\theta_1$, into sine $\theta_1$, and cos $\theta_1$, functions, a second multiplier having inputs coupled to the cos $\theta_1$ output of said solver and to the ratio means output to provide a $$\frac{gD_2}{V_1} \cos \theta_1$$

output, a first differential having inputs coupled to the cos $\theta_1$ solver output and the second multiplier output to add inputs to produce an output corresponding to cos $\theta_2$, a second solver having a cosine input means connected to the cos $\theta_2$ output of the first differential to provide sine $\theta_2$ and $\theta_2$ outputs, averaging means comprising a second differential having inputs coupled to the $\theta_1$ and $\theta_2$ outputs to add these inputs and means coupled to the output of $\theta_1$ and $\theta_2$ to halve the sum of $\theta_1$ and $\theta_2$, a third solver having its input coupled to the averaging means output to produce an output corresponding to $$\sin \frac{\theta_1 + \theta_2}{2}$$

adjustable means adapted to be set in accordance with $D_1$, adjustable means adapted to be set in accordance with $sR$, a first divider responsive to sin $\theta_1$ output of said first resolver and $D_1$ output of said $D_1$ adjustable means to compute $sR_1$, a third differential responsive to $sR$ input from said $sR$ adjustable means and to the output of the divider to compute $sR$ minus $sR_1$, first intermittent drive means responsive to negative values of $sR$ minus $sR_1$ denoting target presence in the mixed layer and blocking positive values of $sR$ minus $sR_1$ denoting target presence below the mixed layer, a third multiplier responsive to sin $\theta_1$ output from said first solver and to the output of said first intermittent drive means to compute $d_1$, a fourth differential responsive to $D_1$ output from said $D_1$ adjustable means and to the $d_1$ output of said fourth differential to compute $D_1$ where said target is below the mixed layer and to compute $D_1$ minus $d_1$ where said target is disposed in the mixed layer, a second divider responsive to $D_2$ output from said $D_2$ adjustable means and to $$\sin \frac{\theta_1 + \theta_2}{2}$$

output from said third solver to compute $sR_2$, a second intermittent drive means responsive to positive values of $sR$ minus $sR_1$ denoting target presence below the mixed layer and blocking negative values of $sR$ minus $sR_1$, a fifth differential responsive to $sR_2$ output of said second divider and to the output of said second intermittent drive to subtract the approximate slant range of the middle thermocline layer from output of the second intermittent drive means, a third intermittent drive responsive to negative output of said fifth differential denoting target disposition in the thermocline layer and unresponsive to positive output of said fifth differential denoting target disposition below the thermocline layer, a fourth multiplier responsive to output of said third intermittent drive and to the third solver $$\sin \frac{\theta_1 + \theta_2}{2}$$

output to compute $d_2$ where the target is disposed in the thermocline layer, a sixth differential responsive to $D_2$ output of said $D_2$ adjustable means and the output of said fourth multiplier, to compute $D_2$ minus $d_2$ where the target is disposed in the thermocline layer and to pass through the $D_2$ output where the target is disposed in the lower isotherm layer, a seventh differential responsive to add the outputs of the fourth and sixth differentials, a fourth intermittent drive responsive to positive output of said fifth differential denoting target position in the isotherm layer and unresponsve to negative output of the fifth differential denoting target position in the thermocline layer, a fifth multiplier responsive to the output of said fourth intermittent drive and to the sine $\theta_2$ output of said second solver to compute $D_3$ and an eighth differential desponsive to outputs of the fifth multiplier and the seventh differential to compute total target depth where the target is disposed in any of the mixed, thermocline, and isotherm layers.

5. In a combination of underwater sound echo-distance slant range measuring equipment of the type wherein an angularly movable sound ray projector is adapted to direct a sound ray toward an underwater target, the water between the target and the surface selectively comprising a mixed upper layer, a mixed upper layer and a thermocline layer or a mixed upper layer, a thermocline middle layer and an isotherm lower layer, the underwater equipment including means to provide indication of the slant range in the water layers, bathythermograph means to provide indications of temperature gradients and of a component of the mixed and of the thermocline layers and a calculator for computing the component of said slant range; said calculator comprising means for computing said component of said slant range in the mixed layer, means for computing said component of said slant range in the thermocline layer, means for computing said component of said slant range in the isotherm layer and means for computing the total component of the slant range in all layers present between the target and the water surface; said means comprising first adjustable means adapted to be set in accordance with the total slant range, second adjustable means adapted to be set in accordance with the mixed layer depth, a solver responsive to the projector depression angle input from the measuring equipment to resolve the angle into sine and cosine function outputs, a divider responsive to said second adjustable means and to the sine output of said solver to compute the slant range of the mixed layer, a first differential responsive to said first adjustable means and the output of said divider to compute the total slant range minus the mixed layer slant range, unidirectional intermittent means responsive to negative output and unresponsive to positive output of said first differential, multiplier means responsive to the output of said intermittent means and the projector depression angle sine output of the solver to compute the elevation of a target in the mixed layer and means responsive to the mixed layer depth and the output of said multiplier to compute the difference therebetween to thereby indicate depth of the mixed layer where the target is disposed below the mixed layer and indicate the depth of the target in the mixed layer where the target is disposed in the mixed layer.

References Cited in the file of this patent

UNITED STATES PATENTS

| | | |
|---|---|---|
| 2,355,502 | Barton | Aug. 8, 1944 |
| 2,403,506 | Crowther | July 9, 1946 |
| 2,437,243 | Curtis | Mar. 9, 1948 |
| 2,438,522 | Smith | Mar. 30, 1948 |
| 2,439,381 | Darlington | Apr. 13, 1948 |
| 2,545,655 | Doyle | Mar. 20, 1951 |

OTHER REFERENCES

Lawson et al.: A Device for Plotting Rays in a Stratified Medium, Review of Scientific Instruments, vol. 18, No. 2 (February 1947), pages 117–120.